(12) United States Patent
Malasorti

(10) Patent No.: US 10,612,689 B2
(45) Date of Patent: Apr. 7, 2020

(54) MANIFOLD FOR DISPENSING UNITS

(71) Applicant: CEADESIGN SRL, Pove Del Grappa (VI) (IT)

(72) Inventor: Natalino Malasorti, Asiago (IT)

(73) Assignee: CEADESIGN SRL, Pove Del Grappa (VI) (IT)

( * ) Notice: Subject to any disclaimer, the term of this patent is extended or adjusted under 35 U.S.C. 154(b) by 14 days.

(21) Appl. No.: 16/070,205

(22) PCT Filed: Feb. 13, 2017

(86) PCT No.: PCT/IB2017/050791
§ 371 (c)(1),
(2) Date: Jul. 13, 2018

(87) PCT Pub. No.: WO2017/137965
PCT Pub. Date: Aug. 17, 2017

(65) Prior Publication Data
US 2019/0017628 A1    Jan. 17, 2019

(30) Foreign Application Priority Data

Feb. 11, 2016 (IT) .................. 102016000014185

(51) Int. Cl.
| | | |
|---|---|---|
| *E03C 1/04* | (2006.01) | |
| *F16K 43/00* | (2006.01) | |
| *F16K 27/06* | (2006.01) | |
| *F16L 41/04* | (2006.01) | |

(Continued)

(52) U.S. Cl.
CPC .......... *F16K 43/003* (2013.01); *E03C 1/0404* (2013.01); *F16K 27/06* (2013.01);
(Continued)

(58) Field of Classification Search
CPC ............. F16K 11/0743; F16K 11/0787; F16K 31/605; F16K 19/006; F16K 43/003;
(Continued)

(56) References Cited

U.S. PATENT DOCUMENTS

| | | |
|---|---|---|
| 1,066,426 A | 7/1913 | Ayerst |
| 2,796,079 A | 6/1957 | Hugg |
| | (Continued) | |

FOREIGN PATENT DOCUMENTS

| | | |
|---|---|---|
| DE | 10 2006 060 929 A1 | 7/2008 |
| GB | 691430 A | 5/1953 |
| JP | S58 45480 U | 3/1983 |

OTHER PUBLICATIONS

International Search Report and Written Opinion dated Apr. 28, 2017, issued in PCT Application PCT/IB2017/050791, filed Feb. 13, 2017.

*Primary Examiner* — Matthew W Jellett
*Assistant Examiner* — Christopher D Ballman
(74) *Attorney, Agent, or Firm* — Workman Nydegger

(57) ABSTRACT

A manifold for water dispensing units includes a manifold body having: one or more inlet paths, an outlet path, a collecting chamber delimited by a lateral wall and communicating with the inlet paths and with the outlet path. The collecting chamber is configured to receive a cartridge body for the regulation of flow. A safety group is associated to the manifold body and includes: a flange removably attached to the manifold body, a safety shutter provided with through inlet gaps and with shut-off surfaces and a control body for the movement of the safety shutter: from a first position in which the through inlet gaps communicate with the inlet paths and contrast means prevent the separation of the control body and the cartridge body from the manifold body, to a second position in which the shut-off surfaces sealingly close the inlet paths. A sliding surface allows the separation of the control body and the cartridge body from the manifold body, and vice versa.

10 Claims, 9 Drawing Sheets

(51) Int. Cl.
*F16K 11/074* (2006.01)
*F16K 31/60* (2006.01)
*F16K 11/00* (2006.01)
*F16K 11/078* (2006.01)

(52) U.S. Cl.
CPC ............ *F16K 43/005* (2013.01); *F16L 41/04* (2013.01); *E03C 1/04* (2013.01); *E03C 1/0403* (2013.01); *E03C 1/0412* (2013.01); *E03C 2001/0415* (2013.01); *F16K 11/0743* (2013.01); *F16K 11/0787* (2013.01); *F16K 19/006* (2013.01); *F16K 31/605* (2013.01); *Y10T 137/7668* (2015.04); *Y10T 137/86815* (2015.04)

(58) Field of Classification Search
CPC ........ F16K 43/005; E03C 1/04; E03C 1/0412; E03C 2001/0415; Y10T 137/7668; Y10T 137/86815
See application file for complete search history.

(56) References Cited

U.S. PATENT DOCUMENTS

| | | | | |
|---|---|---|---|---|
| 2,997,057 A * | 8/1961 | Toth | ................... | F16K 5/0471 137/315.25 |
| 3,202,166 A * | 8/1965 | Butler | ................... | F16K 5/0478 137/614.11 |
| 3,503,587 A * | 3/1970 | Sedutto | ................... | F16K 5/162 251/369 |
| 4,979,530 A * | 12/1990 | Breda | ................. | F16K 11/0856 137/100 |
| 5,340,018 A * | 8/1994 | MacDonald | ....... | G05D 23/1353 236/12.2 |
| 6,089,462 A * | 7/2000 | Osvaldo | ............ | G05D 23/1346 236/12.2 |
| 6,315,210 B1 * | 11/2001 | Kline | ................... | G05D 23/134 236/12.2 |
| 6,325,295 B1 * | 12/2001 | Lorch | ............... | G05D 23/1353 137/269 |
| 7,802,733 B2 * | 9/2010 | Schmitt | ............. | G05D 23/1393 137/597 |
| 7,896,025 B2 * | 3/2011 | Hanson | ................... | E03C 1/04 137/454.6 |
| 7,905,424 B2 * | 3/2011 | Li | ....................... | F16K 11/0743 137/625.4 |
| 7,967,027 B2 * | 6/2011 | Breda | .................... | E03C 1/106 137/614.2 |
| 2004/0016815 A1 * | 1/2004 | Bergmann | ......... | F16K 11/0743 236/12.11 |
| 2008/0164330 A1 * | 7/2008 | Wei | ................... | F16K 11/0743 236/12.1 |
| 2009/0000026 A1 * | 1/2009 | Hanson | ................... | E03C 1/04 4/695 |

* cited by examiner

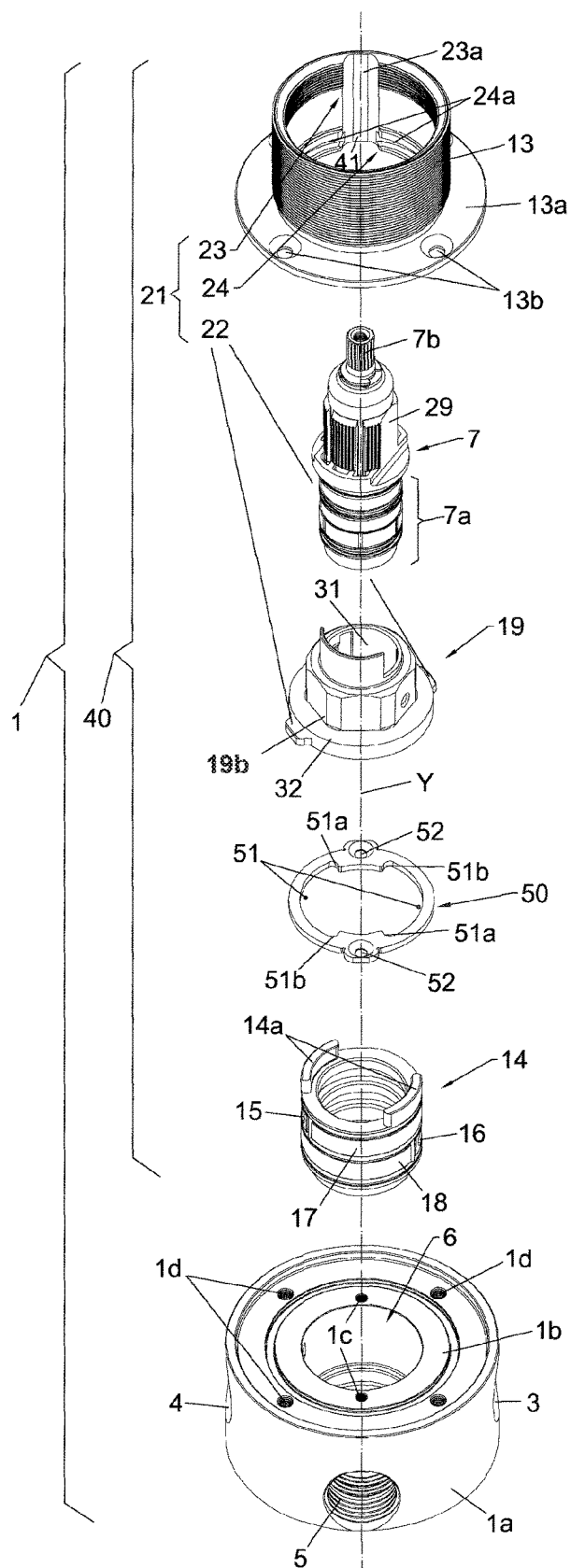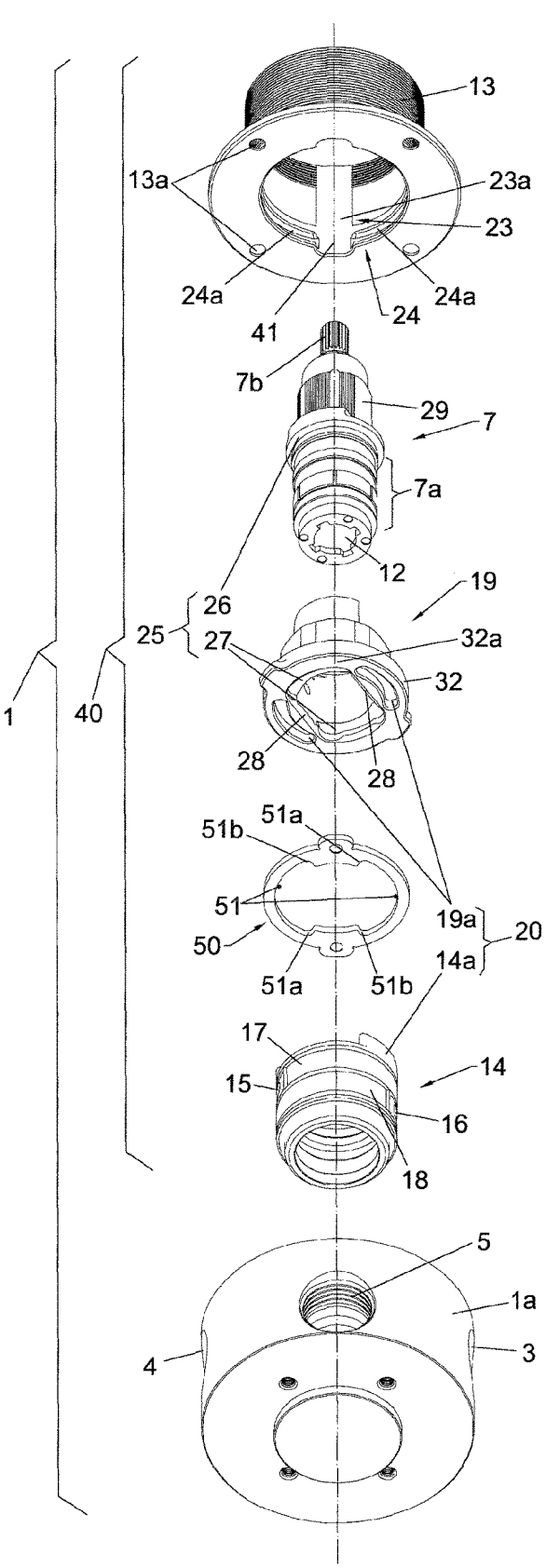
Fig.6
Fig.7

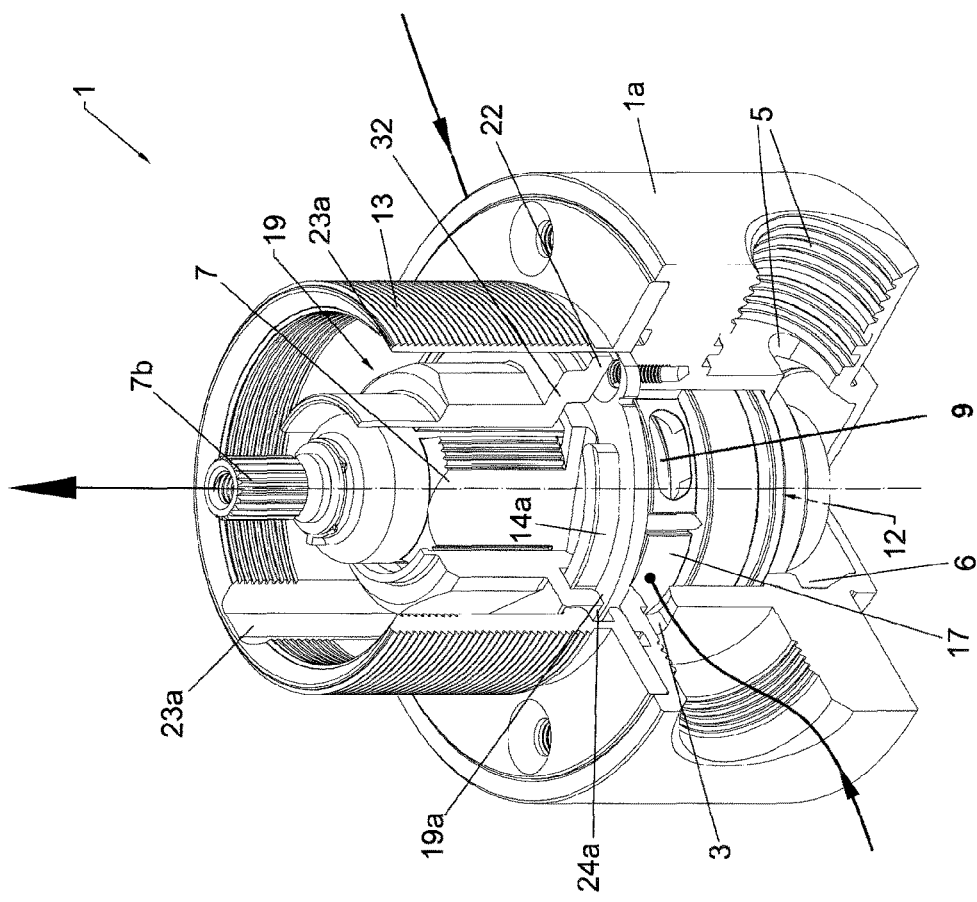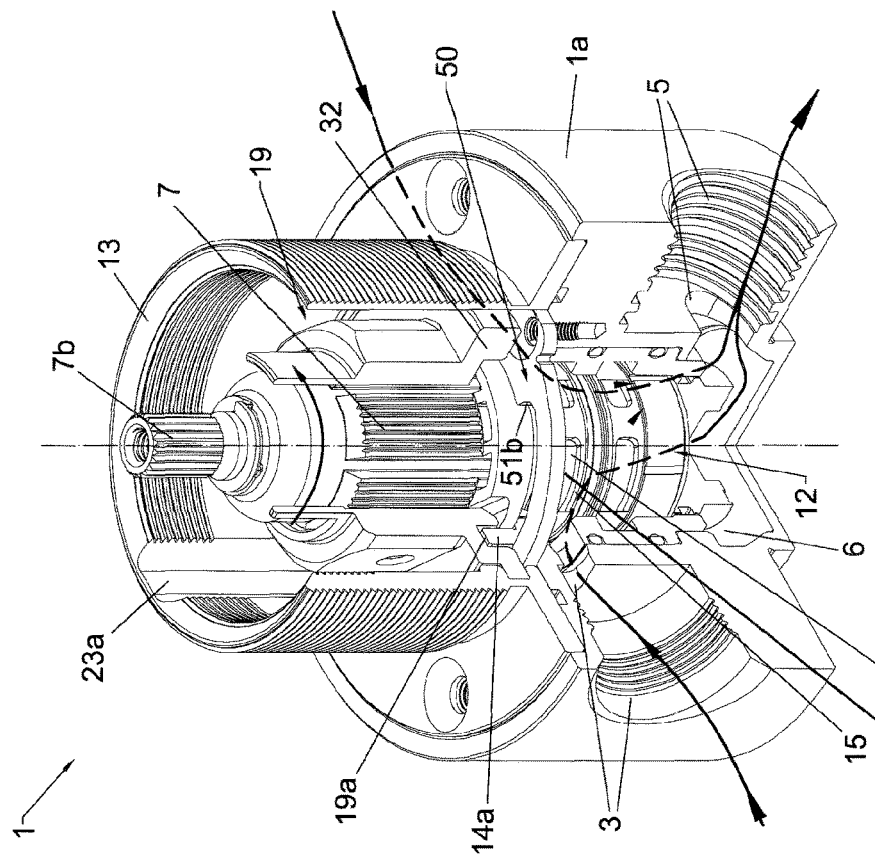

MANIFOLD FOR DISPENSING UNITS

BACKGROUND OF THE INVENTION

1. The Field of the Invention

The invention relates to an improved manifold, particularly suitable for the construction of mixed water dispensing units.

2. The Relevant Technology

As is known, all mixed water dispensing units available on the market, although in their different embodiment shapes and sizes, essentially comprise a manifold configured to be applied to a support structure, for example recessed in a compartment formed in a wall, in which inlet paths are provided, configured for the connection to a hot and cold water supply network, and an outlet path configured for the connection to a mixed water dispensing spout.

A user-maneuverable control member is accommodated in the manifold, commonly referred to as cartridge body, which is interposed between the inlet paths and the outlet path for opening, closing or choking the flow of cold, hot or mixed water exiting from the dispensing spout.

It is well known that when the cartridge body in a dispensing unit must be replaced, before starting the disassembly, it is necessary to interrupt the flow of hot and cold water that arrives from the network to the inlet paths of the manifold so as to remove the cartridge body while preventing water leakage.

To this end, the systems provide that stopcocks are installed in the pipes connecting the main network to the dispensing units, precisely having the function of interrupting the flow of water when one needs to intervene in the dispensing unit to replace the cartridge bodies or carry out other operations.

Systems structured as described, however, have the drawback that, if they comprise a large number of dispensing units, the closure of the stopcocks of the main network pipelines interrupts the flow to all dispensing units and this implies that even to replace a single cartridge body of a single dispensing unit all other dispensing units remain inactive for the entire duration of the operation.

The above drawback may be overcome by installing stopcocks of the main pipelines for each dispensing unit, but this would involve a high increase in cost for constructing the system.

Patent document U.S. Pat. No. 2,796,079 is known, which describes a tap for dispensing water provided with a cartridge (shutter) which regulates the flow of water between the inlet and outlet paths and a safety shutter which, in an operating position, intercepts the incoming water flow into the manifold and coming from the water network.

The drawback of the tap described in the patent document consists in that there are no contrast means adapted to prevent the separation of the cartridge (shutter) from the tap body when the safety shutter does not intercept the incoming water flow in the tap and coming from the water network.

In other words, the cartridge (shutter) can be separated from the tap body regardless of the position in which the safety shutter is arranged and thus regardless of the fact that the safety shutter intercepts or not the incoming water flow into the tap coming from the water network.

Moreover, the constructive of the tap is such that, in any position the safety shutter is arranged, the disassembly of the cartridge (shutter) still requires the prior disassembly of all the other elements that constrain it to the manifold body.

Patent document JPS5845480 is also known, which describes a valve provided with a shutter and a shutter control rod and means adapted to prevent the disassembly of the control rod from the shutter if this is not located in a desired position.

Therefore, the above patent document only teaches a method to make the control rod detachable from the shutter so as to prevent the maneuver thereof by unauthorized persons, or to prevent it from being operated accidentally.

SUMMARY OF THE INVENTION

The present invention is intended to overcome the drawbacks above by implementing an improved manifold for dispensing units in which the cartridge body can be replaced without having to intercept the flow that comes from the main pipelines to the manifold inlet paths.

The object is achieved by a manifold body according to the main claim, to which reference will be made, in which a safety group is provided which automatically shuts off the flow coming from the network pipelines into the manifold when the cartridge body is removed.

Advantageously, in the dispensing units which provide for the use of the improved manifold of the invention, the replacement of the cartridge body is possible without first having to interrupt the water flow coming from the network pipelines.

Therefore, advantageously, in the dispensing units which provide for the use of the improved manifold of the invention, the replacement of the cartridge body is also possible if the system is devoid of taps that intercept the network pipelines feeding the dispensing unit.

Moreover, advantageously, in the dispensing units which provide for the use of the improved manifold of the invention, the replacement of the cartridge body is easier and faster than the dispensing units using manifolds of known type.

BRIEF DESCRIPTION OF THE DRAWINGS

The above object and the advantages will be better highlighted hereinafter in the description of a preferred, but not exclusive, embodiment of the invention that is given only by way of non-limiting example with reference to the accompanying drawings, in which:

FIGS. 6 and 7 show two exploded views of the manifold in FIG. 1 according to two different points of view;

FIGS. 20 to 22 show different axonometric partially sectional views of the manifold of the invention.

DETAILED DESCRIPTION OF THE PREFERRED EMBODIMENTS

Figure 1:
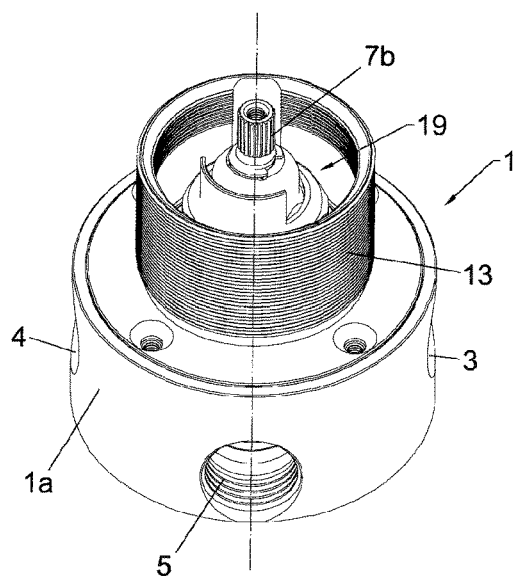
FIG. 1 shows the manifold of the invention in an axonometric view.
Figure 2:
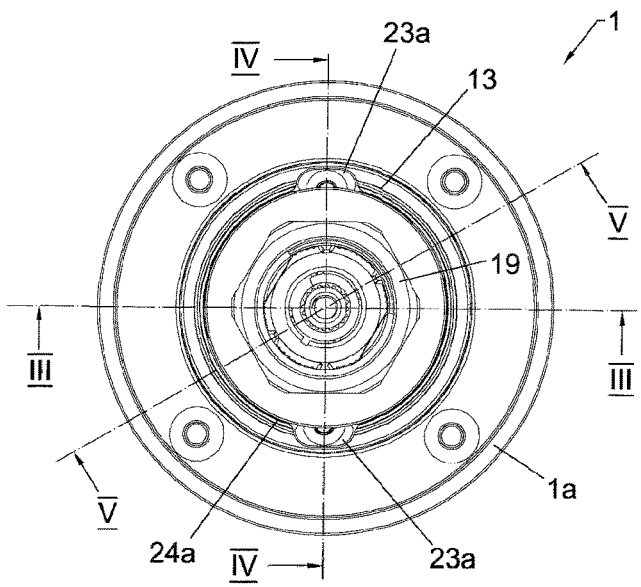
FIG. 2 shows the manifold in FIG. 1 in a top view.
Figure 3:
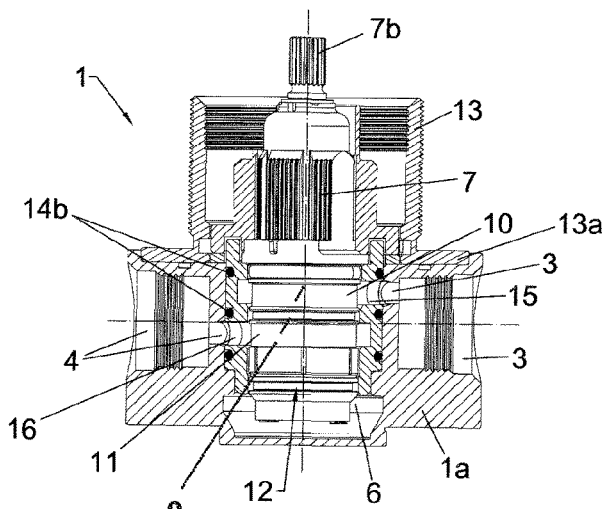
FIGS. 3 to 5 show longitudinal sections of the manifold in FIG. 1 made according to the section planes III; IV; V, respectively, shown in FIG. 2.
Figure 4:
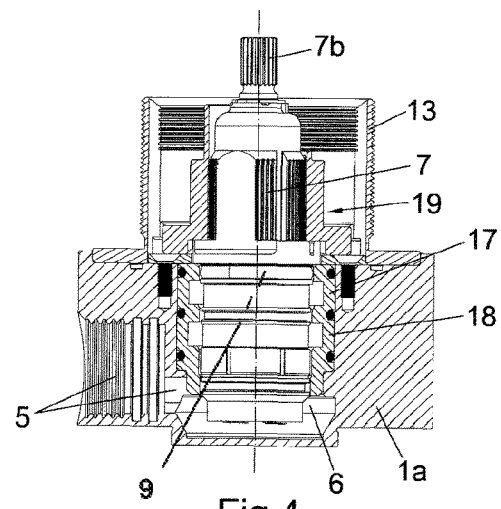
Figure 5:
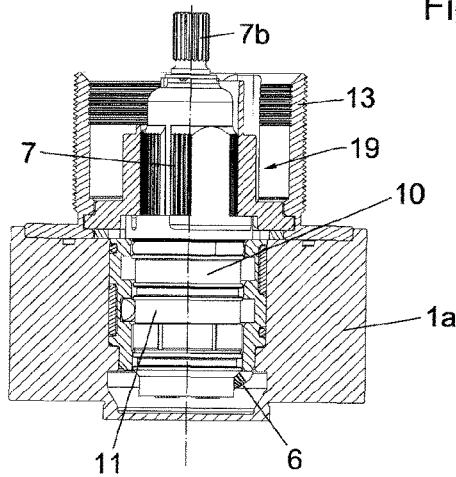

The manifold of the invention is shown in an overall view in FIGS. 1 and 20 to 22, where it is generally indicated with reference numeral 1.

Manifold 1 of the invention is particularly suitable to be applied to water dispensing units and, as can be seen in the figures, it comprises a manifold body 1a in which there are a pair of inlet paths 3, 4 configured to be connected to a hot and cold water supply network, not shown, and one outlet path 5 configured to be connected to the dispensing means of a dispensing unit, also not shown.

It is however understood that the configuration that is described and represented hereinafter relates to a purely indicative embodiment in which the manifold has two inlet paths and one outlet path.

Different embodiments are possible in which the manifold of the invention can comprise any number of inlet paths and any number of outlet paths.

Moreover, the manifold of the invention can be used in any known dispensing unit available on the market.

With reference to FIGS. 1 to 22, it is seen that a collecting chamber 6 is formed in the manifold body 1a which identifies a longitudinal axis Y and communicates with the inlet paths 3, 4 and with the outlet path 5.

The collecting chamber 6 is internally delimited by a lateral wall 6a and is configured to receive the insertion of the central body 7a of a cartridge body 7 adapted to regulate the flow between the inlet paths 3, 4 and the outlet path 5.

Depending on the use for which manifold 1 is intended, the cartridge body 7 may be a thermostatic body adapted to regulate the temperature of the mixed water that is dispensed through the outlet path 5 or a mixer tap or even a different cartridge type.

A mixing chamber 9 is provided in the central body 7a of the cartridge body 7 which communicates with the inlet paths 3, 4 and with the outlet path 5 of the manifold body 1a, by means of inlet mouths 10, 11 and an outlet mouth 12, respectively, formed in the same central body 7a.

According to the invention, manifold 1 comprises a safety group, visible in greater detail in the exploded FIGS. 6 to 8 and 17 to 19, where it is generally indicated with reference numeral 40, which is associated to the manifold body 1a and comprises:
- a flange 13 removably fixed to the manifold body 1a above the collecting chamber 6 and arranged externally coaxial to the cartridge body 7;
- a safety shutter 14 provided with through inlet gaps 15, 16 and with shut-off surfaces 17, 18 adapted to alternately cooperate with the inlet paths 3, 4 of the manifold body 1a;
- a control body 19 for the movement of the safety shutter 14 with respect to the inlet paths 3, 4.

In particular, it is noted that the control body 19 is arranged coaxially outside the cartridge body 7 and within flange 13 and is positioned above the safety shutter 14.

The latter is configured to be arranged coaxially inside the collecting chamber 6 and the through inlet gaps 15, 16 are formed therein.

Moreover, the interior of the safety shutter 14 is configured to receive the insertion of the central body 7a of the cartridge body 7.

It is noted that the outer surface of the safety shutter 14, the inner seat of the safety shutter 14 and the central body 7a of the cartridge body 7 seated in said inner seat as well as the collecting chamber 6 in which the safety shutter 14 is seated have a circular section according to sectional planes orthogonal to the longitudinal axis Y.

Therefore, the mutual movements between the above elements are movements of rotation around said longitudinal axis Y.

Moreover, the hydraulic seal against any leaks is ensured by the presence of sealing rings 14b, preferably of the OR type, which are interposed between the safety shutter 14 and the collecting chamber 6.

First coupling means 20 are provided, which are configured to make the control body 19 and the safety shutter 14 mutually removably integral.

The above first coupling means 20, as is particularly shown in said FIGS. 6 to 8 and 17 to 19, comprise one or more slotted bodies 14a, preferably but not necessarily two slotted bodies 14a belonging to the safety shutter 14, which are configured to removably couple with corresponding slotted seats 19a belonging to the control body 19.

Second coupling means 21 are also provided, which are configured to make the control body 19 and flange 13 mutually removably integral.

Said second coupling means 21 comprise one or more shaped elements 22, preferably but not necessarily two shaped elements 22 belonging to the control body 19 and arranged on opposite sides of the same control body 19, which are configured to alternately couple with sliding means 23 and with contrast means 24 belonging to flange 13.

It is noted that the control body 19 is provided with a through hole 31 configured to receive the coupling of the cartridge body 7 and an annular flange 32 which is arranged above the safety shutter 14 and in which the slotted seats 19a are formed.

Moreover, peripherally to the annular flange 32, said shaped elements 22 are provided, which are arranged on opposite sides of the same annular flange 32 and are adapted to alternately cooperate with the aforementioned sliding means 23 and contrast means 24 of flange 13.

In particular, the sliding means 23 comprise one or more longitudinal grooves 23a, preferably but not necessarily two longitudinal grooves 23a opposite to each other, which develop parallel to axis Y within flange 13, while the contrast means 24 comprise an annular groove 24a formed peripherally within flange 13.

Particularly, the annular groove 24a is formed in the vicinity of the end where flange 13 is provided with an annular zone 13a which allows it to be attached to the manifold body 1a.

Moreover, the annular groove 24a and the longitudinal grooves 23a intersect each other at intersection areas 41.

The first coupling means 20 and the second coupling means 21 are configured to allow the integral movement of the control body 19 and the safety shutter 14 with respect to the manifold body 1a and to flange 13:
- from a first position A visible in FIG. 20, in which the contrast means 24 receive the shaped element 22 to prevent the separation of the control means 19 and of the cartridge body 7 from the manifold body 1a when the through inlet gaps 15, 16 of the safety shutter 14 communicate with the inlet paths 3, 4 of the manifold body 1a to allow the flow towards the outlet paths 5; to a second position B visible in FIG. 21, in which the sliding means 23 receive the shaped element 22 to allow the separation of the control means 19 and the cartridge body 7 from the manifold body 1a for moving both along the longitudinal direction Y when the shut-off surfaces 17, 18 of the safety shutter 14 sealingly close the inlet paths 3, 4 of the manifold body 1a, and vice versa.

Manifold 1 also comprises third coupling means 25 which are particularly visible in FIGS. 7, 8, 18 and 19 and are configured to detect the correct coupling position of the control body 19 with the cartridge body 7 and to make them integral during the movement of the control body 19 from the first position A to the second position B, and vice versa.

As is seen, the third coupling means 25 comprise a shaped core 26 belonging to the cartridge body 7 and configured to be removably received in a corresponding shaped seat 27 which is formed in the lower surface 32a of the annular flange 32 facing the manifold body 1a.

When manifold 1 is assembled, flange 13, the control body 19, the safety shutter 14 and the cartridge body 7 are arranged coaxial with each other along the longitudinal axis Y, and in particular:
- the safety shutter 14 is housed inside the collecting chamber 6;
- the central body 7a of the cartridge body 7 is housed inside the safety shutter 14;
- the control body 19 is arranged above the collecting chamber 6 and externally to the cartridge body 7;
- flange 13 is arranged externally to the control body 19 with the annular area 13a attached to the manifold body 1a;
- the control body 19 is associated to the safety shutter 14 via the first coupling means 20, to the cartridge body 7 via the third coupling means 25 and to flange 13 via the second coupling means 21.

In such conditions, end 7b of the cartridge body 7 that protrudes from flange 13 may be coupled with a control member, not shown in the figures.

At shim 1b delimiting the manifold body 1a and comprised between the manifold body 1a and the overlying control body 19, a rotation limiter ring 50 is arranged in abutment, which is provided with shaped housings 51 opposite to each other which are adapted to receive the insertion of the slotted bodies 14a of the safety shutter 14.

The rotation limiter ring 50 is attached to the manifold body 1a by means of screws which are coupled in holes 52 and 1c made in the rotation limiter ring 50 and in the manifold body 1a, respectively, and each shaped housing 51 is delimited by shaped ends 51a and 51b which serve as limit switches for the slotted bodies 14a so as to limit the rotation of the safety shutter 14 between the two operating positions indicated by A and B and shown in FIGS. 20 and 21, respectively.

As regards the control body 19, it is also noted that the through hole 31 that longitudinally runs through it is provided with one or more abutment surfaces 28, preferably but not necessarily two abutment surfaces 28 opposing each other.

The abutment surface 28 cooperate in contact with corresponding abutment counter-surfaces 29 belonging to the cartridge body 7 and allow the coupling of the shaped core 26 of the cartridge body 7 in the corresponding shaped seat 27 belonging to the control body 19 for the sliding of the cartridge body 7 according to the direction defined by the longitudinal axis Y.

Moreover, the control body 19 has the outer surface 19b shaped with a prismatic shape with a polygonal cross section, preferably hexagonal, in order to be received in the profile of a polygonal control key.

Operationally, the assembly of manifold 1 of the invention is now described with particular reference to the exploded views shown in FIGS. 6 to 8 and 17 to 19.

Figure 8:
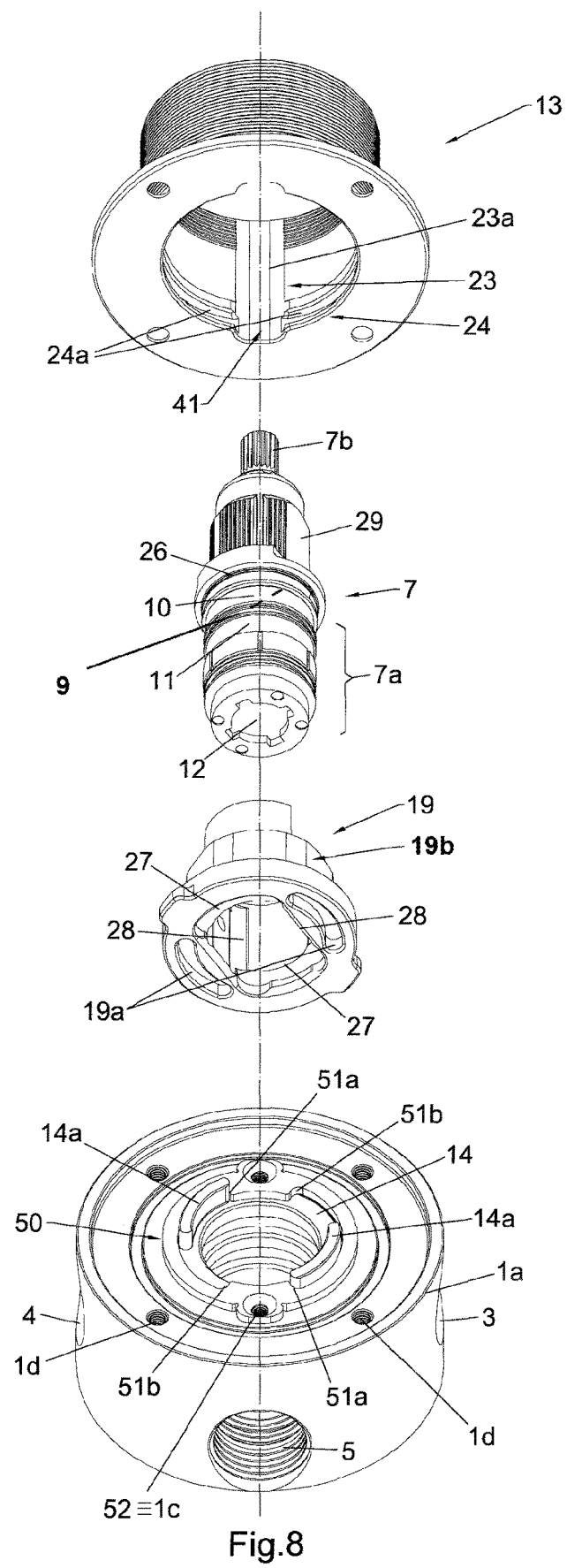
FIG. 8 shows FIG. 6 enlarged and partly reassembled.
Figure 9:
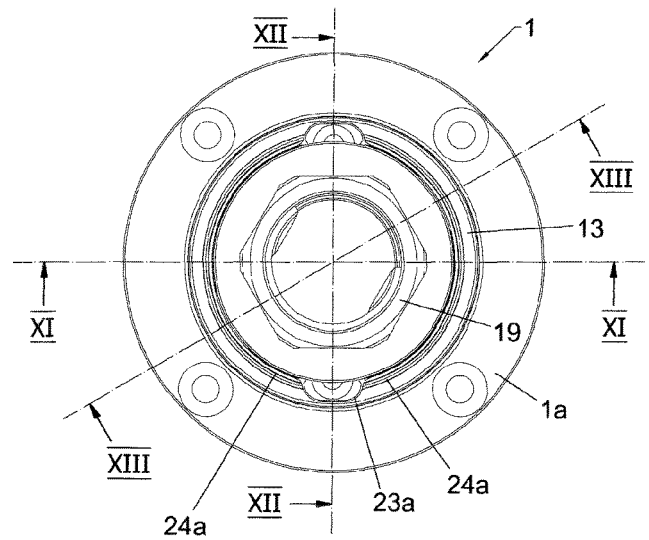
FIG. 9 shows the manifold in FIG. 2 without the central element.
Figure 10:
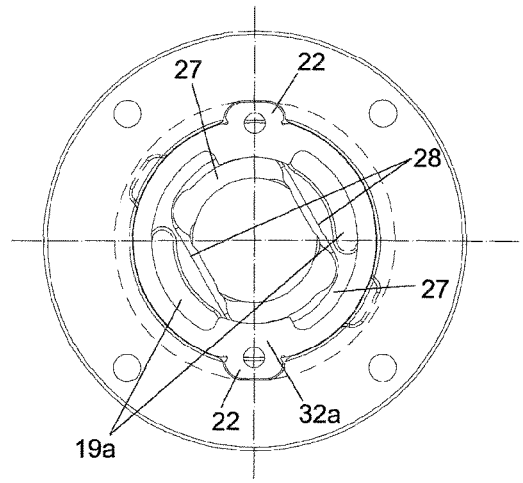
FIG. 10 shows the manifold in FIG. 9 rotated by 180°.
Figure 11:
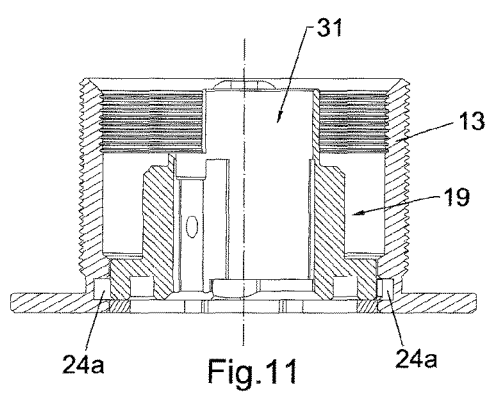
FIGS. 11 to 13 show longitudinal sections of the manifold in FIG. 9 made according to the section planes XI; XII; XIII, respectively, shown in the same FIG. 9.
Figure 12:
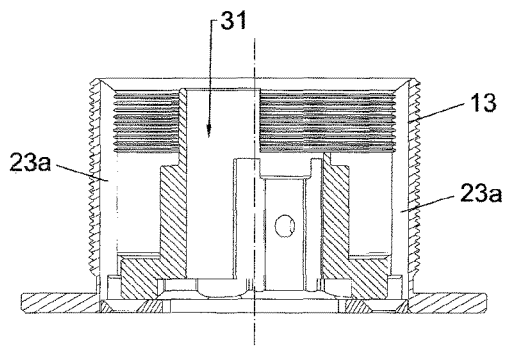
Figure 13:
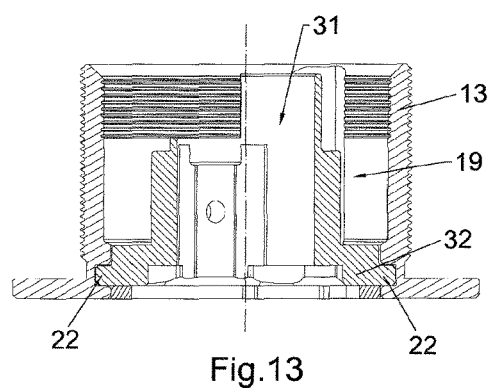
Figure 14A:
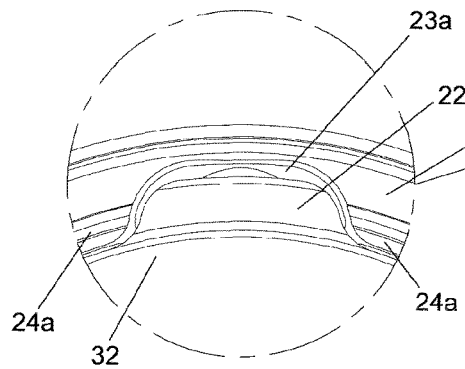
FIG. 14a shows an enlarged detail of FIG. 14.
Figure 14:
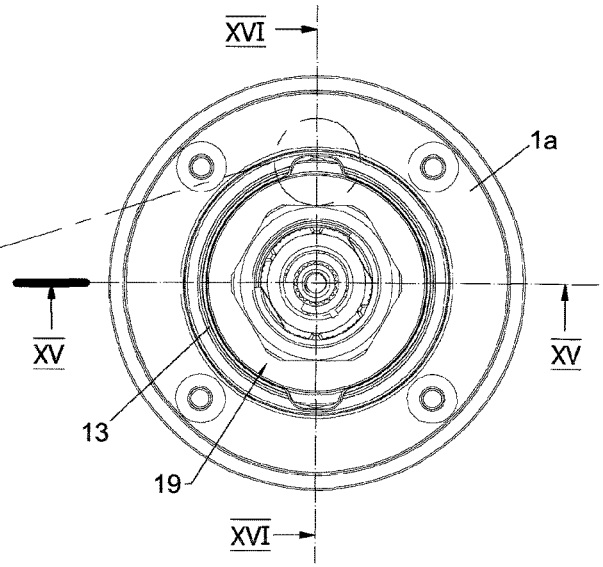
FIG. 14 shows the manifold in FIG. 2 in a different operating position.
Figure 15:
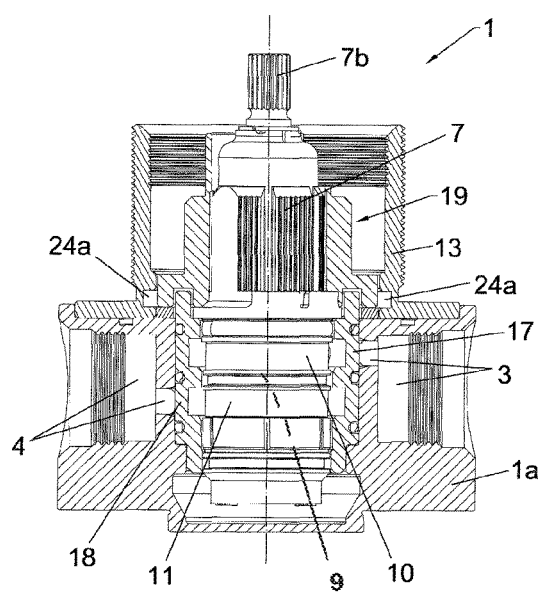
FIGS. 15 and 16 show longitudinal sections of the manifold in FIG. 14 made according to the section planes XV and XVI, respectively.
Figure 16:
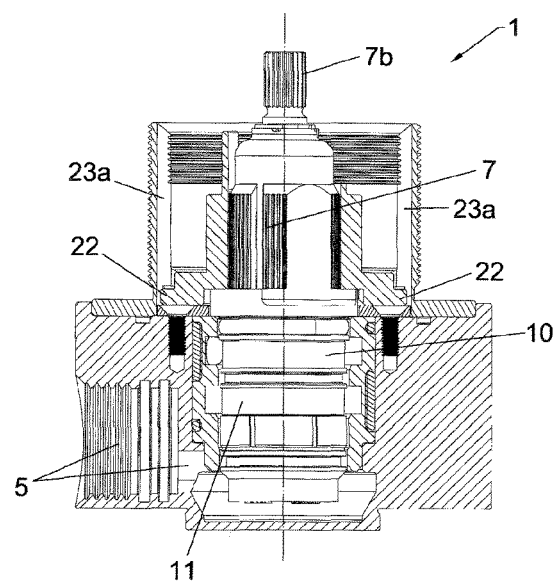
Figure 17:
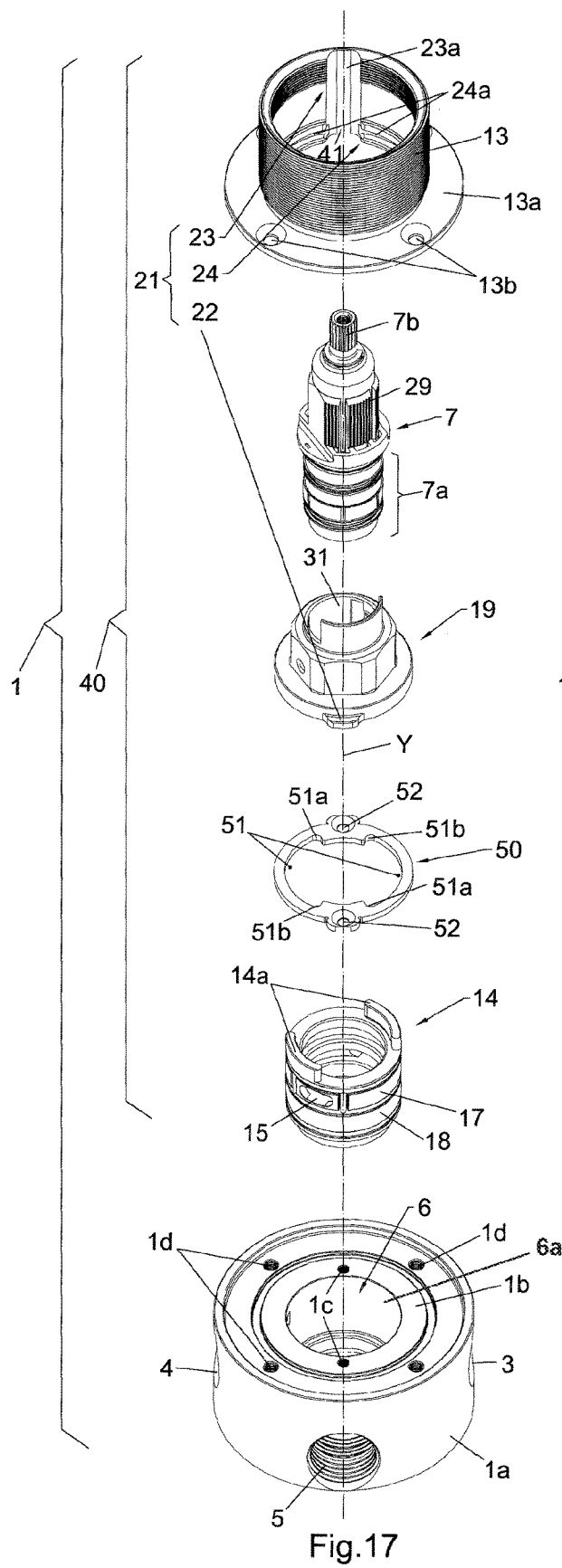
FIGS. 17 and 18 show two exploded views of the manifold in FIG. 14 according to two different points of view.

First, starting from the configuration shown in FIGS. 6 and 7, the safety shutter 14 is inserted in the collecting chamber 6 and is arranged in the position shown in FIG. 8, in which the through inlet gaps 15, 16 of which it is provided are positioned at the inlet paths 3, 4 of the manifold body 1a.

The rotation limiter ring 50 is then fixed on the shim 1b of the manifold body 1a by means of screws which are coupled in holes 52 and 1c made in the rotation limiter ring 50 and in the manifold body 1a, respectively, taking care that each slotted body 14a of the safety shutter 14 is received in the respective shaped housing 51 of the rotation limiter ring 50 and contrasts against the corresponding first shaped end 51a of the respective shaped housing 51.

In these conditions, the through inlet gaps 15, 16 of the safety shutter 14 communicate with the inlet paths 3, 4 of the manifold body 1a to allow the flow towards the outlet path 5.

Then, the cartridge body 7 is inserted into the control body 19 taking care that the shaped core 26 of the cartridge body 7 is housed in the shaped seat 27 of the control body 19 in order to make the cartridge body 7 and the control body 19 integral with each other.

Then, the central body 7a of the cartridge body 7 is inserted within the safety shutter 14 taking care that the slotted bodies 14a of the latter are received in the corresponding slotted seats 19a of the control body 19.

Finally, flange 13 is arranged coaxial externally to the control body 19 taking care that the shaped elements 22 of the control body 19 are received in the annular groove 24a of flange 13.

Flange 13 can now be attached to the manifold body 1a by means of screws that are housed in holes 13b and 1d made in flange 13 and in the manifold body 1a, respectively.

Manifold 1 is now assembled in the first operating position A in which the incoming flow through the inlet paths 3, 4 passes through the through gaps 15, 16 of the safety shutter 14 and then inside the mixing chamber 9 of the central body 7a of the cartridge body 7 to reach the outlet path 5 as shown by the arrows on the drawings.

In this first operating position A, which corresponds to the normal operating position of manifold 1 in which the dispensed flow can be regulated by the user by acting on the control end 7b of the cartridge body 7, the cartridge body 7 cannot be removed from the manifold body 1a since the contrast of the shaped elements 22 of the control body 19 against the annular groove 24a of flange 13 prevents the separation of the control means 19 and consequently also of the cartridge body 7.

Figure 18:
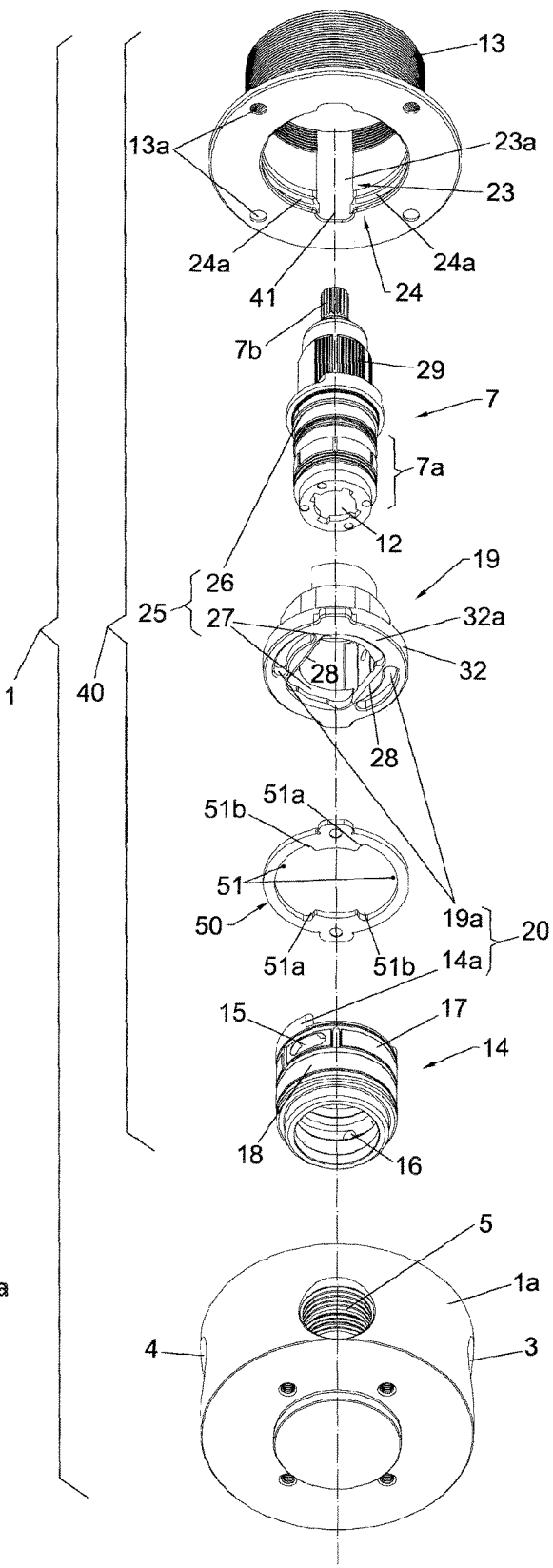
Figure 19:
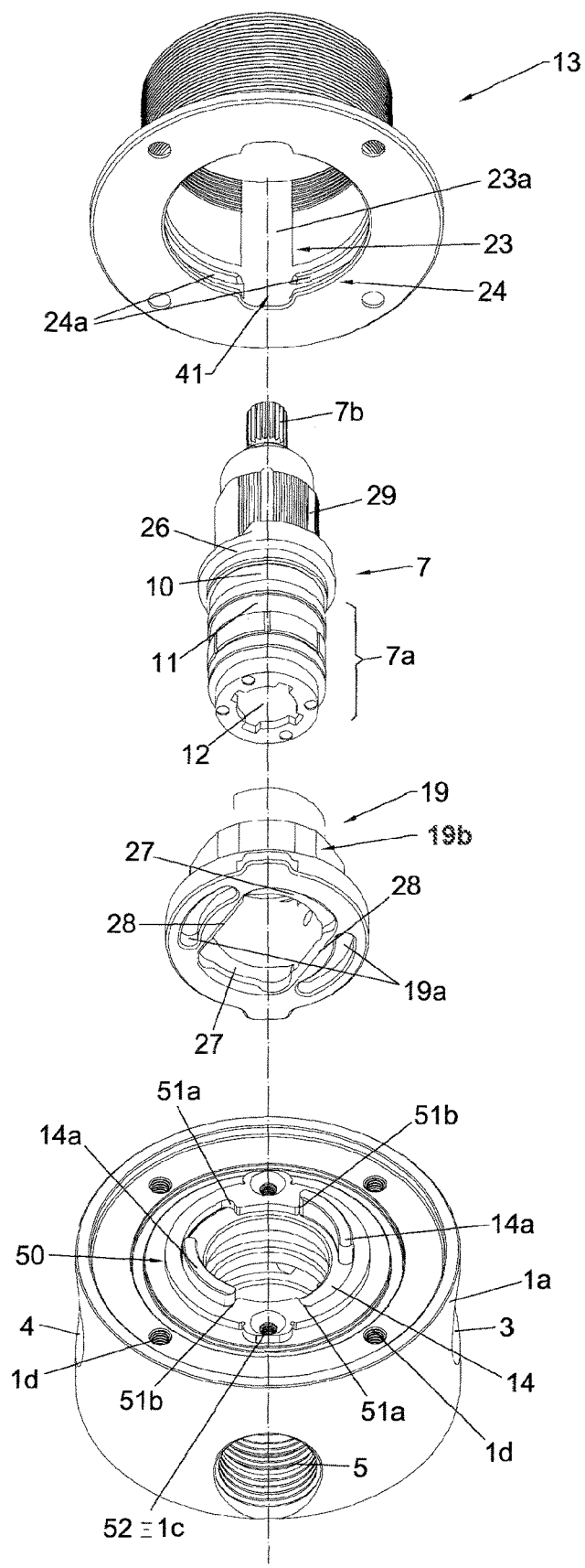
FIG. 19 shows FIG. 17 enlarged and partly reassembled.
Figure 22:
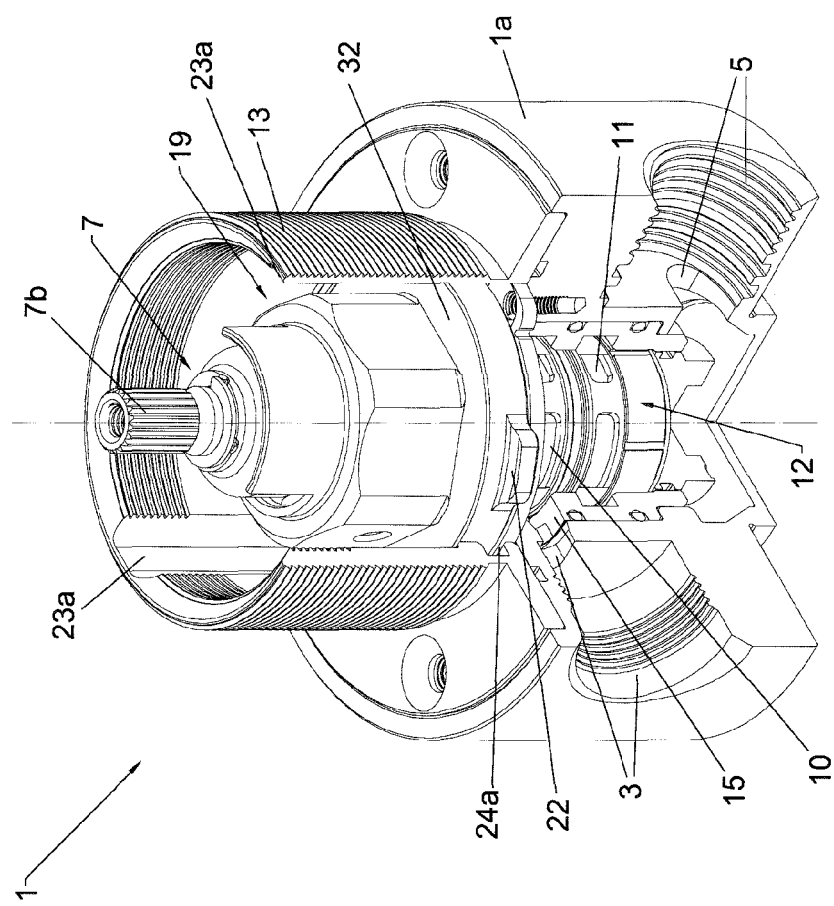

In order to remove the cartridge body 7, it is sufficient to rotate the control body 19 in counter clockwise direction indicated by the arrow in FIG. 20, up to place it in the second operating position B that is seen in FIG. 21 and in more detail in FIGS. 18 and 19, in which the second ends 51b of each shaped housing 51 of the rotation limiter ring 50 contrast with the corresponding slotted bodies 14a of shutter 14.

In this position, the shut-off surfaces 17, 18 of the safety shutter 14 close the inlet paths 3, 4 of the manifold body 1a and prevent the flow through the central body 7a of the cartridge body 7 and then through the collecting chamber 6 and the outlet path 5.

At the same time, the shaped elements 22 of the control means 19 are arranged at the longitudinal grooves 23a of flange 13 and, since they are no longer constrained within the annular groove 24a, they can slide along the same longitudinal grooves 23a and allow separating the control body 19 from the manifold body 1a by movement of the control body 19 along flange 13 in vertical direction Y and in the direction indicated by the arrow shown in FIG. 21.

At this point, the cartridge body 7, being no longer constrained, can also be separated from the manifold body 1a by movement along flange 13 without the danger of spilling of water since the inlet paths 3, 4 of the manifold body 1a are closed by the shut-off surfaces 17, 18 of the safety shutter 14.

The cartridge body 7 can be replaced with another replacement one and once replaced, manifold 1 is reassembled by carrying out the operations already described.

According to the foregoing, it can thus be understood that the manifold of the invention achieves all the objects and advantages mentioned above.

In particular, the object to allow replacement of the cartridge body in a simple and quick manner is achieved, especially without having to intervene on the interception means of the network pipelines feeding the dispensing unit.

This allows the advantage of being able to replace the cartridge body in the manifold without having to interrupt the flow coming from the supply network.

Moreover, the use of the manifold of the invention allows the replacement of cartridge bodies also of dispensing units connected to systems without stopcocks of the network pipelines that feed them.

Variants and modifications not described and illustrated may be made to the manifold of the invention in the construction step, which may be useful to improve its operation or to make the construction thereof more cost-effective.

It is understood that should such variants or modifications fall within the scope of the following claims, they shall be understood as all protected by the present patent.

The invention claimed is:

1. A manifold for water dispensing units, comprising:
   a manifold body in which the following is identified:
      one or more inlet paths configured to be connected to a water supply network;
      at least one outlet path configured to be connected to dispensing means of said dispensing unit;
      a collecting chamber defining a longitudinal axis, delimited by a lateral wall and communicating with said inlet paths and with said outlet path, said collecting chamber having a cartridge body received therein for the regulation of flow through said inlet paths and output path and in which a mixing chamber is present, provided with inlet mouths configured to communicate with said inlet paths and at least one outlet mouth configured to communicate with said outlet path;
   a safety group associated with said manifold body and comprising:
      a flange removably attached to said manifold body;
      a safety shutter provided with through inlet gaps and with shut-off surfaces adapted to alternately cooperate with said inlet paths;
      a control body for the movement of said safety shutter;
         from at least a first position, in which said through inlet gaps of said safety shutter communicate with said inlet paths,
         to at least a second position in which said shut-off surfaces of said safety shutter sealingly close said inlet paths, and vice versa,
      contrast means belonging to said flange and to cooperating with one or more shaped elements belonging to the control body to prevent the separation of said control body and said cartridge body from said manifold body when said safety shutter is arranged in said first position;
      sliding means belonging to said flange and cooperating with said shaped elements to allow the separation of said control body and said cartridge body from said manifold body for moving both along said flange in said longitudinal direction when said safety shutter is arranged in said second position,
      wherein said sliding means comprise at least one longitudinal groove which develops parallel to said axis internally to said flange and said contrast means comprise at least one annular groove formed peripherally inside said flange, said at least one longitudinal groove and said at least one annular groove intersect each other at one or more intersection areas.

2. The manifold according to claim 1, wherein said safety group also comprises:
   first coupling means configured to make said control body and said safety shutter mutually removably integral and comprising at least one slotted body belonging to said safety shutter and at least one slotted seat belonging to said control body, said slotted body and said slotted seat being configured to be mutually coupled in a removable manner;
   second coupling means configured to make said control body and said flange mutually removably integral and comprising said one or more shaped elements belonging to said control body and configured to alternately couple with said sliding means and with said contrast means belonging to said flange.

3. The manifold according to claim 1, wherein said safety shutter is placed within said collecting chamber where it is comprised between said lateral wall and a central body of said cartridge body.

4. The manifold according to claim 1, wherein:
   said flange is placed above said collecting chamber and externally to said cartridge body;
   said control body is arranged above said safety shutter, externally to said cartridge body and internally to said flange;
   said flange, said control body and said safety shutter are arranged mutually coaxial according to said longitudinal axis.

5. The manifold according to claim 1, further comprising third coupling means configured to make said control body and said cartridge body mutually removably integral, said third coupling means comprising at least one shaped core belonging to said cartridge body and a corresponding shaped seat belonging to said control body, configured to be mutually coupled in a removable manner.

6. The manifold according to claim 1, wherein said control body has a through hole for coupling to said cartridge body and an annular flange configured to be placed above said safety shutter, said one or more shaped elements being provided externally to said annular flange.

7. The manifold according to claim 6, wherein said through hole of said control body is provided with at least one abutment surface and at least one abutment counter-surface is provided externally to said cartridge body, said abutment surface and said abutment counter-surface being opposite to each other and configured to reciprocally couple in a sliding manner when said cartridge body is inserted in said through hole.

8. The manifold according to claim 1, wherein the outer surface of said control body has a prismatic shape with polygonal cross section.

9. The manifold according to claim 1, wherein said flange is removably attached to said manifold body by screws housed in holes made in said flange and in said manifold body.

10. The manifold according to claim 1, wherein said control body and said cartridge body can be removed from said manifold body without removal of said flange from said manifold body.

\* \* \* \* \*